| United States Patent [19] | [11] | 4,184,010 |
|---|---|---|
| Dey et al. | [45] | Jan. 15, 1980 |

[54] METHOD FOR PREVENTING EXPLOSION IN THIONYL CHLORIDE DEPOLARIZER CELLS

[75] Inventors: Arabinda N. Dey, Needham; James H. Him, 28 Carey Ave., Burlington, both of Mass.

[73] Assignee: P. R. Mallory & Co. Inc., Indianapolis, Ind.

[21] Appl. No.: 875,054

[22] Filed: Feb. 3, 1978

Related U.S. Application Data

[63] Continuation-in-part of Ser. No. 865,149, Dec. 28, 1977, Pat. No. 4,115,629, which is a continuation-in-part of Ser. No. 700,421, Jun. 28, 1976, abandoned.

[51] Int. Cl.² ............................................. H01M 2/12

[52] U.S. Cl. ......................................... 429/50; 429/53
[58] Field of Search .................. 429/56, 174, 50, 196, 429/53, 54

[56] References Cited

U.S. PATENT DOCUMENTS

| 3,909,303 | 9/1975 | Rosansky et al. ...................... 429/56 |
| 4,053,692 | 10/1977 | Dey ...................................... 429/174 |

*Primary Examiner*—Donald L. Walton
*Attorney, Agent, or Firm*—Ronald S. Cornell; Israel Nissenbaum; Martin M. Glazer

[57] ABSTRACT

A method for preventing thionyl chloride depolarizer cells from exploding by pressure relieving such cells at a low pressure.

4 Claims, No Drawings

METHOD FOR PREVENTING EXPLOSION IN THIONYL CHLORIDE DEPOLARIZER CELLS

The invention herein described was made in the course of or under a contract with the Department of the Army.

This application is a continuation-in-part of Copending U.S. application Ser. No. 865,149 filed Dec. 28, 1977 now U.S. Pat. No. 4,115,629 which is in turn a continuation-in-part of U.S. application Ser. No. 700,421 now abandoned.

This invention relates to thionyl chloride containing electrochemical cells, and more particularly to thionyl chloride depolarizer cells wherein there is an explosion hazard.

Thionyl chloride ($SOCl_2$) depolarizer cells and particularly those having lithium or other alkali metal or alkaline earth metal anodes provide high energy densities and voltages as well as nearly flat discharge curves making such cells highly desirable. However, it is a characteristic of such cells that when they are abused, such as by cell shorting, there is a marked tendency for these cells to explode.

It is therefore an object of the present invention to provide a method whereby such explosive consequences of cell abuse, such as by cell shorting, may be prevented. This and other objects will be more clearly seen from the following discussion.

Generally, it has been discovered that thionyl chloride depolarizer cells can be prevented from exploding upon abuse such as by shorting by a method whereby the cell is vented or relieved of pressurized conditions at a low pressure not exceeding about 350 p.s.i.g. and preferably below about 200 p.s.i.g.

Thionyl chloride depolarizer cells are generally not pressurized, aside from normal vapor pressure, nor do they achieve high pressures. Accordingly, they do not, as a result, require pressure relief systems such as those used in pressurized cells or in cells subject to increased pressure. The pressure relief systems of cells subject to increased pressure, are generally designed to prevent the walls or sealing members of the cell container from exploding as a result of such pressure. Thionyl chloride cells, although they do not reach such pressure, have on occasion, by some heretofore unidentified chemical processes, been subject to explosion upon conditions such as shorting, as a result of chemical interactions within the cell rather than from internal pressure. The relationship between the pressure build-up and explosion consequences has not been established. However, it has been discovered that, by venting thionyl chloride depolarizer cells before they achieve an internal pressure of about 350 p.s.i.g., and preferably below about 200 p.s.i.g., chemical reactions within the cell leading to possible explosion consequences can be prevented.

The vent, as described, should preferably be of sufficient size such that the venting is nearly instantaneous whereby further detrimental chemical action is prevented. A low pressure vent fulfilling the requirements for venting a thionyl chloride depolarizer cell comprises an aperture in a cell container covered by a metallic disc with the disc adhered to the periphery of the aperture by a glass-to-metal seal as described in U.S. Pat. No. 4,115,629 and U.S. application Ser. No. 700,421 which disclosures are herein incorporated by reference. As described therein, venting occurs when a rise in internal pressure causes the closure to flex outwardly to an extent sufficient to produce a shear force which fractures either the glass of the seal or the bond between the glass and metal of either the metal disc or container.

Although the following example is illustrative of a particular low pressure venting means, low pressure relief by other means in thionyl chloride depolarizer cells may also be useful in preventing such cells from exploding and are included within the scope of the present invention.

EXAMPLE

Three D size cylindrical electrochemical cell containers (1.28" O.D. and 2.4" height) each having a top formed of KOVAR metal with a 5/32 inch diameter aperture are fitted with a metallic disc of the same metal, said disc having an outside diameter of 0.375". A matched expansion, metal-to-glass-to-metal seal is formed between the disc and the covered periphery of the can aperture. The glass used is a preformed ring made of Corning 7,052 glass having a thickness of 0.015 inch. In order to bond the glass to the metal members, the metal disc and can top are first oxidized, then placed in a furnace with the glass ring between the disc and the aperture periphery. The glass is melted and annealed at a temperature of 1150° C. for 25 minutes to form the hermetic bonds.

The components of the cells are constructed with a lithium anode and a carbonaceous cathode by winding in a conventional manner 20 inch by 1.75 inch electrodes having a glass separator therebetween and placing the resulting roll of material in the aforementioned containers. Thereafter, the can is filled with 1 (M) $LiAlCl_4$-thionyl chloride electrolyte. After completion, the cells are deliberately shorted externally. The cells vent at about $105 \pm 5$ p.s.i.g. without explosion.

The foregoing example is presented for the purpose of illustrating the invention and its advantages. It is understood that changes in cell structure and components therein as well as the use of other low pressure vents or pressure relief means may be made without departing from the scope of the present invention as defined by the following claims.

What is claimed is:

1. A method for preventing chemical explosion of an electrochemical cell containing thionyl chloride comprising the step of relieving the pressure in said cell before said pressure exceeds 350 p.s.i.g.

2. The method of claim 1 wherein said cell is relieved of pressure before it exceeds 200 p.s.i.g.

3. The method of claim 2 wherein said cell is relieved of pressure by venting.

4. The method of claim 1 wherein said electrochemical cell further includes lithium as the anode thereof.

* * * * *